United States Patent [19]
Phillips

[11] Patent Number: 4,591,694
[45] Date of Patent: May 27, 1986

[54] HEATED BED MODULE FOR ANIMALS

[75] Inventor: John A. Phillips, San Diego, Calif.

[73] Assignee: Zoological Society of San Diego, San Diego, Calif.

[21] Appl. No.: 727,847

[22] Filed: Apr. 26, 1985

Related U.S. Application Data

[63] Continuation of Ser. No. 489,200, Apr. 27, 1983.

[51] Int. Cl.[4] ............................................. A01K 1/035
[52] U.S. Cl. ........................................ 219/217; 5/422; 219/345
[58] Field of Search ............... 219/217, 430, 439, 345; 119/1, 33; 5/421, 422, 423, 451

[56] References Cited

U.S. PATENT DOCUMENTS

| | | | |
|---|---|---|---|
| 1,041,167 | 10/1912 | Rogers | 119/33 |
| 2,842,651 | 7/1958 | Neely | 5/422 |
| 2,961,524 | 11/1960 | Newman | 5/423 |
| 2,963,565 | 12/1960 | Moore | 219/345 |
| 2,980,058 | 4/1961 | Hoffman | 219/217 |
| 3,041,441 | 6/1962 | Elbert | 219/345 |
| 3,096,428 | 7/1963 | Dublirer | 219/345 |
| 3,585,356 | 6/1971 | Hall | 5/422 |
| 4,257,349 | 3/1981 | Carlin | 219/217 |
| 4,278,869 | 7/1981 | McMullan | 219/217 |
| 4,332,214 | 6/1982 | Cunningham | 119/33 |

Primary Examiner—Clarence L. Albritton
Assistant Examiner—Teresa J. Walberg
Attorney, Agent, or Firm—Brown, Martin & Haller

[57] ABSTRACT

A heated bed module for use by animals, consists of a box-like unit having an animal supporting top panel and a shallow liquid containing chamber immediately below the top panel. A thermostatically controlled heater is installed below the liquid chamber with suitable support and insulation and access is provided for filling and draining the chamber. The unit is completely self-contained and used alone or coupled to other units to make a heated assembly for any size of animal.

4 Claims, 5 Drawing Figures

U.S. Patent  May 27, 1986  4,591,694
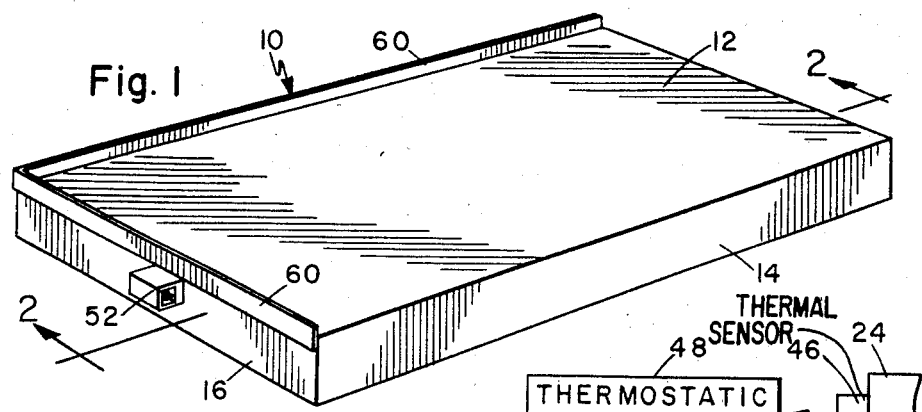
Fig. 1
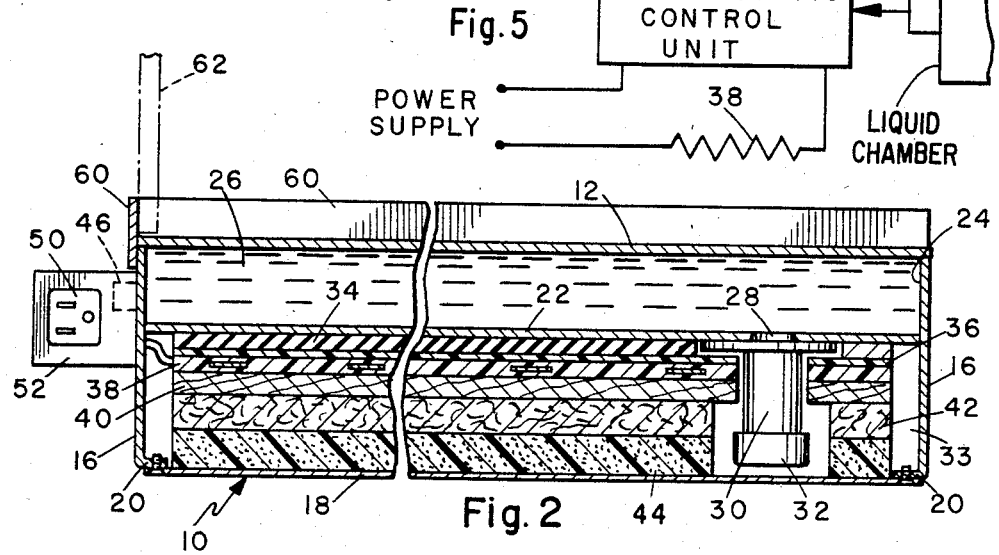
Fig. 5
Fig. 2
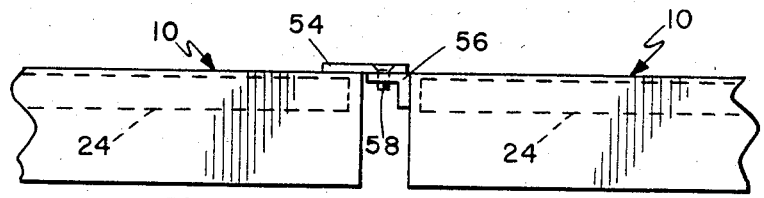
Fig. 3
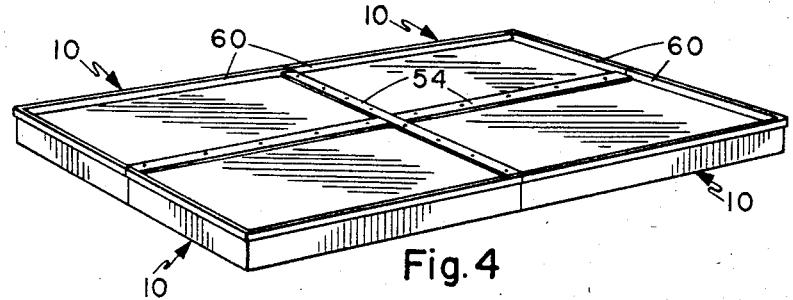
Fig. 4

HEATED BED MODULE FOR ANIMALS

This is a continuation of application Ser. No. 489,200 filed Apr. 27, 1983.

BACKGROUND OF THE INVENTION

In many zoos it is necessary to provide heated quarters for certain animals at various times, such as during cold weather, during maternity and when caring for young animals. A conventional method for heating is by the use of heat lamps, which are not particularly energy efficient and can be hazardous. Protection must be provided to prevent contact by the animal and, on occasion such lamps have exploded, which frightens the animal and scatters broken glass.

Other systems using steam or hot water circulation are complex and usually require a permanent installation, which may have a limited use not justifying the expense. It would be very advantageous to have a heating system which is completely portable, easy to handle and set up in any desired location, economical to use and which is safe for the animals.

SUMMARY OF THE INVENTION

The heated bed described herein is a modular box-like unit which can be used alone or joined to other units to form a bed of any suitable size. The unit comprises a substantially rigid structure with a top panel for supporting an animal and may be of convenient size which will facilitate handling. Immediately below the top panel is a shallow chamber for containing a liquid such as water, the chamber having readily accessible means for filling and draining. Below the chamber is a thermostatically controlled heater, with suitable support and insulation in the lower portion of the unit.

Any convenient covering may be used over the unit for the animal's comfort and provision is made for attaching walls or rails to confine the animal if necessary. The unit is completely safe and is adaptable to a wide variety of animals.

The primary object of this invention is to provide a new and improved heated bed module for animals.

Another object of this invention is to provide an animal bed having a heated liquid chamber under the top supporting surface for even, wide spread heating, with means for precise control of the heat.

A further object of this invention is to provide a heated animal bed which can be made in easily handled modular form and assembled into any required size.

Other objects and advantages will be apparent in the following detailed description, taken in conjunction with the accompanying drawing, in which:

FIG. 1 is a perspective view of a typical heated bed module;

FIG. 2 is an enlarged sectional view taken on line 2—2 of FIG. 1;

FIG. 3 is a side elevation view illustrating the connection of two modules;

FIG. 4 is a perspective view of a four module assembly; and

FIG. 5 is a diagram of the heating system.

DESCRIPTION OF THE PREFERRED EMBODIMENT

The bed module 10 comprises a rectangular box-like frame having a top panel 12, side walls 14, end walls 16 and a bottom panel 18 which is removably attached to inwardly turned flanges 20 of the side and end walls. Spaced below the top panel 12 is an inner panel 22 secured and sealed to the side and end walls and enclosing a shallow chamber 24, which contains the heat distributing liquid 26. The structure is preferably of metal such as aluminum alloy, or the like, which can be easily welded together into a simple rigid unit. However, other materials may be used depending on the size and specific use of the bed. Due to its intended use, however, the structure is substantially rigid, including the top panel, to minimize damage and avoid leakage.

Inner panel 22 has an access opening 28, below which is secured a filler pipe 30 having a closure cap 32, the filler pipe also serving as a drain outlet. As illustrated, the filler pipe is enclosed by the bottom panel 18 for security, but could be made accessible through the bottom panel if desired. Alternatively, the filler and drain means could extend through a side or end of the module.

While the size of the unit can vary, one particularly useful size of module is 24×48 inches, with a liquid chamber depth of about one inch. In this size the chamber holds approximately five gallons of liquid, which allows the module to be handled easily, even when filled and ready for use. The most suitable liquid is water, with a portion of antifreeze added if necessary.

In the lower housing portion 33 of the unit immediately below the inner panel is a layer of heat conductive electrical insulation 34, such as Cerafoam, Which is a spun ceramic material used as a substitute for asbestos. Below the insulation 34 is a separation sheet 36 of thin vinyl, which is also an electrical insulator but a good heat conductor. Under the separation sheet is an electrical heater 38 of the basic type used in conventional flexible bag waterbeds, usually having resistance tapes or wires sealed in a flat envelope.

The heater is held in place by a rigid support panel 40, of plywood, particle board, or the like. The lower portion of the lower housing 33 is filled with thermal insulation materials, such as a layer of glass fiber mat 42 and a bottom layer 44 of Styrofoam or similar lightweight foam plastic. This lower insulation minimizes heat loss through the bottom panel to the floor.

The desired temperature range of the heated bed as in the range of 75–125 degrees Fahrenheit, which is suitable for a variety of animals and is easily obtained by means of a conventional type of thermostatic control used in waterbeds. As illustrated in FIG. 5, a thermal sensor 46 is mounted on a wall of liquid chamber 24 and is connected to a thermostatic control unit 48, which controls the electrical power from a suitable power supply through the heater 38. For maximum safety of the animals, the metal frame is connected to ground.

The thermostatic control unit 48 and an electrical connector 50 may be attached to one end wall 16 and enclosed in a suitable housing 52, as in FIG. 2. Alternatively, these elements may be recessed in the frame to prevent the animal from breaking the structure off. The chamber 24 can be completely filled, since the limited heating range will prevent any distortion or damage due to expansion of the liquid, but a relief valve may be installed if desired.

If a large heated surface is needed, two or more modules may be joined by means of a flange 54 on one module and a cooperating flange 56 on the other, secured by screws 58, or the like, as in FIG. 3. A typical assembly of four bed modules is shown in FIG. 4, which could be large enough for a horse, camel, or similar sized animal.

For added convenience, small flange-like rails 60 can be secured to some or all of the side and end walls to project above top panel 12. These rails can be used for attachment of maternity sides 62, or similar restraining walls to keep an animal on the bed. This is particularly useful for controlling very young animals.

It will be obvious that the heated bed module is adaptable to a variety of zoo and domestic animals to provide a safe and suitable controllable source of heat. Any suitable covering may be placed over the module for the animal's comfort if required. The shallow layer of liquid requires a minimum of power to maintain the heat and also minimizes weight, so that the modules are easy to handle and arrange. Each unit is completely self-contained and can be stored ready for immediate use.

Having described my invention, I claim:

1. A heated bed module for animals, comprising:
   a unitary, substantially rigid box-like frame having a planar animal supporting top panel, with surrounding side walls depending therefrom, and a removable bottom panel secured to said side walls;
   a rigid inner panel spaced below said top panel and sealed to said side walls to enclose a shallow liquid containing chamber;
   said chamber having access means for filling and draining said chamber;
   said frame having a lower housing extending below said chamber and enclosed by said bottom panel;
   a rigid support member within said lower housing spaced above said bottom panel;
   a thermally conductive electrical insulation layer immediately below said inner panel;
   a thermostatically controlled heater mounted between said support member and said electrical insulation layer;
   thermal insulation substantially filling said lower chamber below said support member;
   said top panel, said inner panel, and said support member being substantially parallel to one another and having substantially equal surface areas.

2. A heated bed module according to claim 1 including rail members fixed to certain side and end portions of said frame and projecting above said top panel.

3. A heated bed module according to claim 1 and including attachment means on certain portions of said frame for attachment to similar adjacent modules to establish adjoining co-planar module top panels to support large animals.

4. A heated bed module according to claim 1, wherein:
   said chamber liquid access means is connected to said inner panel and is contained within said lower housing.

* * * * *